(12) United States Patent
Motoyama

(10) Patent No.: US 11,057,530 B2
(45) Date of Patent: Jul. 6, 2021

(54) INFORMATION PROCESSING APPARATUS, INFORMATION PROCESSING SYSTEM, CONTROL PROGRAM, AND CONTROL METHOD

(71) Applicant: SHARP KABUSHIKI KAISHA, Osaka (JP)

(72) Inventor: Kiyoto Motoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/178,589

(22) Filed: Nov. 2, 2018

(65) Prior Publication Data
US 2019/0141202 A1 May 9, 2019

(30) Foreign Application Priority Data
Nov. 6, 2017 (JP) .............................. JP2017-214132

(51) Int. Cl.
*G06F 3/12* (2006.01)
*H04N 1/00* (2006.01)

(52) U.S. Cl.
CPC ........ *H04N 1/00244* (2013.01); *G06F 3/1205* (2013.01); *G06F 3/1272* (2013.01); *G06F 3/1287* (2013.01); *H04N 1/00392* (2013.01); *H04N 1/00973* (2013.01)

(58) Field of Classification Search
CPC ........... H04N 1/00244; H04N 1/00392; H04N 1/00973; G06F 3/1272; G06F 3/1205; G06F 3/1287
See application file for complete search history.

(56) References Cited

U.S. PATENT DOCUMENTS

| | | | | |
|---|---|---|---|---|
| 2010/0183321 | A1* | 7/2010 | Kim | G06F 3/1203 399/38 |
| 2011/0299106 | A1* | 12/2011 | Mori | G06F 3/1205 358/1.9 |
| 2013/0201509 | A1* | 8/2013 | Miyazawa | H04N 1/00962 358/1.13 |
| 2015/0286451 | A1* | 10/2015 | Armstrong | G06F 3/1253 358/1.15 |
| 2017/0242636 | A1* | 8/2017 | Minami | G06F 3/1213 |

FOREIGN PATENT DOCUMENTS

JP  2009-070221 A  4/2009

\* cited by examiner

*Primary Examiner* — Huo Long Chen
(74) *Attorney, Agent, or Firm* — ScienBiziP, P.C.

(57) ABSTRACT

An information processing system includes a relay server, an image forming apparatus, and a plurality of content servers. The image forming apparatus requests the relay server to transmit a print content selected by a user. When receiving a transmission request of the print content transmitted from the image forming apparatus, the relay server acquires the print content from the content server of contents provider which provides the print content, and the relay server configures a print condition according to the type of the print content in accordance with a print condition table. The relay server transmits first data to the image forming apparatus. The first data includes the print content and a setting command corresponding to the print condition according to the type of the print content.

9 Claims, 15 Drawing Sheets

| TYPES OF CONTENTS / PRINT SETTING ITEMS | LANDSCAPE PICTURE | PORTRAIT PICTURE | ANIMATION IMAGE | DOCUMENT |
|---|---|---|---|---|
| SOURCE PROFILE | sRGB | sRGB | sRGB | sRGB |
| OUTPUT PROFILE | PROFILE A (PLACING IMPORTANCE ON GRADATION) | PROFILE A (PLACING IMPORTANCE ON GRADATION) | PROFILE B (HIGH CHROMA) | PROFILE C (STANDARD) |
| PROCESS RESOLUTION | 1200 dpi | 1200 dpi | 1200 dpi | 1200 dpi |
| OUTPUT RESOLUTION | 1200 dpi | 1200 dpi | 1200 dpi | 1200 dpi |
| RENDERING INTENT — CHARACTER PART | — | — | — | BALANCE |
| RENDERING INTENT — FIGURE PART | — | — | — | BALANCE |
| RENDERING INTENT — IMAGE PART | GIVING PRIORITY TO GRADATION | GIVING PRIORITY TO GRADATION | GIVING PRIORITY TO GRADATION | GIVING PRIORITY TO GRADATION |
| GRAY COMPENSATION — CHARACTER PART | — | — | — | MONOCHROME BLACK |
| GRAY COMPENSATION — FIGURE PART | — | — | — | MONOCHROME BLACK |
| GRAY COMPENSATION — IMAGE PART | COMPOSITE BLACK | COMPOSITE BLACK | COMPOSITE BLACK | COMPOSITE BLACK |
| SCREEN — CHARACTER PART | — | — | — | HIGH RESOLUTION |
| SCREEN — FIGURE PART | — | — | — | INTERMEDIATE RESOLUTION |
| SCREEN — IMAGE PART | LOW RESOLUTION | LOW RESOLUTION | LOW RESOLUTION | LOW RESOLUTION |
| OUTPUT GRADATION CORRECTION | SOFT | SOFT | STANDARD | STANDARD |
| PURE BLACK | OFF | OFF | OFF | ON |
| PURE COLOR MAINTENANCE | OFF | OFF | OFF | ON |
| IMAGE COMPRESSION | IRREVERSIBLE COMPRESSION | IRREVERSIBLE COMPRESSION | IRREVERSIBLE COMPRESSION | REVERSIBLE COMPRESSION |
| ENHANCEMENT/SMOOTHING FILTER | SMOOTH (INTERMEDIATE) | SMOOTH (INTERMEDIATE) | SMOOTH (WEAK) | STANDARD |
| LINE THINNING/CHARACTER THINNING PROCESS | OFF | OFF | OFF | MODERATE |

FIG. 6

| PRINT SETTING ITEMS / TYPES OF CONTENTS | | LANDSCAPE PICTURE | PORTRAIT PICTURE | ANIMATION IMAGE | DOCUMENT |
|---|---|---|---|---|---|
| SOURCE PROFILE | | sRGB | sRGB | sRGB | sRGB |
| OUTPUT PROFILE | | PROFILE A (PLACING IMPORTANCE ON GRADATION) | PROFILE A (PLACING IMPORTANCE ON GRADATION) | PROFILE B (HIGH CHROMA) | PROFILE C (STANDARD) |
| PROCESS RESOLUTION | | 1200 dpi | 1200 dpi | 1200 dpi | 1200 dpi |
| OUTPUT RESOLUTION | | 1200 dpi | 1200 dpi | 1200 dpi | 1200 dpi |
| RENDERING INTENT | CHARACTER PART | — | — | — | BALANCE |
| | FIGURE PART | — | — | — | BALANCE |
| | IMAGE PART | GIVING PRIORITY TO GRADATION | GIVING PRIORITY TO GRADATION | GIVING PRIORITY TO GRADATION | GIVING PRIORITY TO GRADATION |
| GRAY COMPENSATION | CHARACTER PART | — | — | — | MONOCHROME BLACK |
| | FIGURE PART | — | — | — | MONOCHROME BLACK |
| | IMAGE PART | COMPOSITE BLACK | COMPOSITE BLACK | COMPOSITE BLACK | COMPOSITE BLACK |
| SCREEN | CHARACTER PART | — | — | — | HIGH RESOLUTION |
| | FIGURE PART | — | — | — | INTERMEDIATE RESOLUTION |
| | IMAGE PART | LOW RESOLUTION | LOW RESOLUTION | LOW RESOLUTION | LOW RESOLUTION |
| OUTPUT GRADATION CORRECTION | | SOFT | SOFT | STANDARD | STANDARD |
| PURE BLACK | | OFF | OFF | OFF | ON |
| PURE COLOR MAINTENANCE | | OFF | OFF | OFF | ON |
| IMAGE COMPRESSION | | IRREVERSIBLE COMPRESSION | IRREVERSIBLE COMPRESSION | IRREVERSIBLE COMPRESSION | REVERSIBLE COMPRESSION |
| ENHANCEMENT/SMOOTHING FILTER | | SMOOTH (INTERMEDIATE) | SMOOTH (INTERMEDIATE) | SMOOTH (WEAK) | STANDARD |
| LINE THINNING/CHARACTER THINNING PROCESS | | OFF | OFF | OFF | MODERATE |

FIG. 11

| TYPES OF CONTENTS<br>IMAGE FORMING APPARATUS | LANDSCAPE PICTURE | PORTRAIT PICTURE | ANIMATION IMAGE | DOCUMENT |
|---|---|---|---|---|
| IMAGE FORMING APPARATUS a | ○ | — | ○ | — |
| IMAGE FORMING APPARATUS b | ○ | ○ | — | ○ |
| IMAGE FORMING APPARATUS c | ○ | ○ | — | — |
| ⋮ | ⋮ | ⋮ | ⋮ | ⋮ |

# INFORMATION PROCESSING APPARATUS, INFORMATION PROCESSING SYSTEM, CONTROL PROGRAM, AND CONTROL METHOD

BACKGROUND

1. Field

The present disclosure relates to information processing apparatuses, information processing systems, control programs, and control methods. The present disclosure specifically relates to, for example, an information processing apparatus connected to an output terminal and content servers, an information processing system, a control program, and a control method.

2. Description of the Related Art

An example of the related art is disclosed in Japanese Unexamined Patent Application Publication No. 2009-70221. A content providing system of the related art includes a content server and a color multifunction device installed in a retail establishment or the like and connected to the content server. In the content providing system of the related art, when the color multifunction device receives an instruction given by a user, the color multifunction device downloads a content specified by the instruction from the content server and prints the content thus downloaded onto a prescribed paper sheet.

In the content providing system of the related art, however, a print setting is not changeable for each content, and therefore, depending on types of contents specified by instructions, reproduction of the tinge, the character, and the like of a printed material may be inappropriate, and the printed material is not available in sufficient quality.

Thus, an aspect of the present disclosure is to provide a novel information processing apparatus, a novel information processing system, a novel control program, and a novel control method.

Thus, an aspect of the present disclosure is to provide an information processing apparatus, an information processing system, a control program, and a control method which are configured to improve the quality of a printed material in content providing service.

SUMMARY

A first aspect of the disclosure is an information processing apparatus which is connected to an output terminal and a plurality of content servers over a network. The information processing apparatus includes a storage unit, an acquisition unit, and a transmission unit. The storage unit is configured to store a print condition table describing print conditions according to respective types of a plurality of contents provided from the plurality of content servers. The acquisition unit is configured to acquire a print content from any of the plurality of content servers in accordance with a transmission request from the output terminal. The transmission unit is configured to transmit the print content acquired by the acquisition unit and a setting command denoting a print condition corresponding to a type of the print content to the output terminal.

A second aspect of the disclosure is a control program of an information processing apparatus which is connected to an output terminal and a plurality of content servers over a network. The control program is configured to cause a processor of the information processing apparatus to function as a storage unit configured to store a print condition table describing print conditions according to respective types of a plurality of contents provided from the plurality of content servers, an acquisition unit configured to acquire a print content from any of the plurality of content servers in accordance with a transmission request from the output terminal, and a transmission unit configured to transmit the print content acquired by the acquisition unit and a setting command denoting a print condition corresponding to a type of the print content to the output terminal.

A third aspect of the disclosure is a control method performed by a processor of an information processing apparatus which is connected to an output terminal and a plurality of content servers over a network, the control method including: storing a print condition table describing print conditions according to respective types of a plurality of contents provided from the plurality of content servers; acquiring a print content from any of the plurality of content servers in accordance with a transmission request from the output terminal; and transmitting the print content acquired in the acquiring of the print content and a setting command denoting a print condition corresponding to a type of the print content to the output terminal.

A fourth aspect of the disclosure is an information processing system including an information processing apparatus connected to a plurality of content servers and an output terminal connected to the information processing apparatus. The information processing apparatus includes: a first storage unit storing a first print condition table describing print conditions according to respective types of a plurality of contents provided from a plurality of content servers, and a transmission history table describing a type of a content having been transmitted to the output terminal; an acquisition unit configured to acquire a print content from any of the plurality of content servers in accordance with a transmission request from the output terminal; a determination unit configured to determine, with reference to the transmission history table, whether or not a content which is the same type as the print content acquired by the acquisition unit has been transmitted to the output terminal; and a transmission unit configured to transit first data to the output terminal when the determination unit determines that the print content has not been transmitted to the output terminal, the first data including the print content acquired by the acquisition unit and a setting command denoting a print condition corresponding to a type of the print content, and to transmit second data to the output terminal when the determination unit determines that the print content has been transmitted to the output terminal, the second data including the print content and type information denoting the type of the print content. The output terminal includes: a second storage unit configured to store a second print condition table in which print conditions corresponding to types of contents which the output terminal has printed are described; a transmission request unit configured to request the information processing apparatus to transmit the print content; a reception unit configured to receive the first data or the second data; a setting unit configured to configure a print condition corresponding to the print content with reference to the second print condition table, in accordance with the type information included in the second data, when the reception unit receives the second data; and a print unit configured to print the print content in accordance with a print condition denoted by the setting command included in the first data, when the reception unit receives the first data and to print the print content in accordance with the print condition configured by the setting unit when the reception unit receives the second data.

The above-described aspects, other aspects, features, and advantages of the present disclosure will further be clarified based on the detailed description of the following embodiments with reference to the drawings.

BRIEF DESCRIPTION OF THE DRAWINGS

FIG. 6 is a view illustrating an example of a print condition table;

FIG. 11 is a view illustrating an example of a transmission history table of a second embodiment;

DESCRIPTION OF THE EMBODIMENTS

First Embodiment

Figure 1:
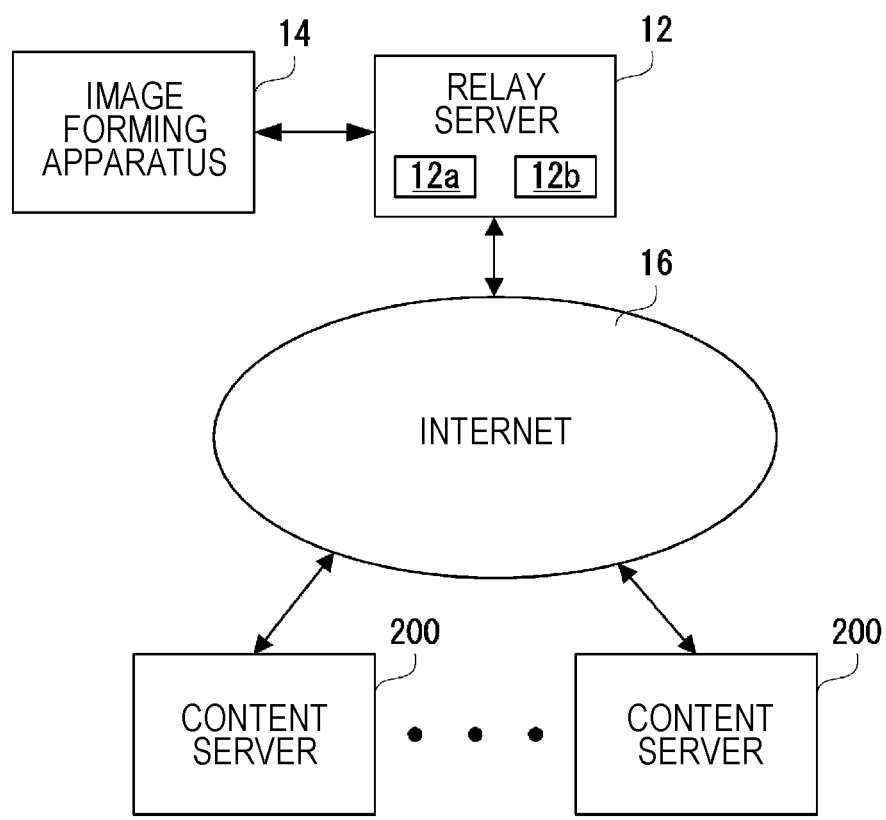
FIG. 1 is a view illustrating an example of a configuration of an information processing system of the present disclosure.

FIG. 1 is a view illustrating an example of a configuration of an information processing system 10 of the present disclosure.

In FIG. 1, the information processing system 10 which is a first embodiment of the present disclosure includes a relay server 12 which is an example of an information processing apparatus, an image forming apparatus 14, and a plurality of content servers 200. The relay server 12 is connected to be able to communicate with each of the plurality of content servers 200 over a network such as the Internet 16. The relay server 12 is connected to be able to communicate with the image forming apparatus 14 over a network.

In FIG. 1, one image forming apparatus 14 is illustrated, but two or more image forming apparatuses 14 may be provided.

The relay server 12 is a general-purpose server and includes components such as a CPU 12a, RAM 12b, and a communication module.

In the first embodiment, the image forming apparatus 14 is a multifunction peripheral (MFP) having a copy function, a printer function, a scanner function, a facsimile function, and the like. Note that the present disclosure is applicable to not only multifunction devices but also printing apparatuses (printers) and other image forming apparatuses such as multimedia kiosk (MMK) terminals provided with printers.

Figure 2:
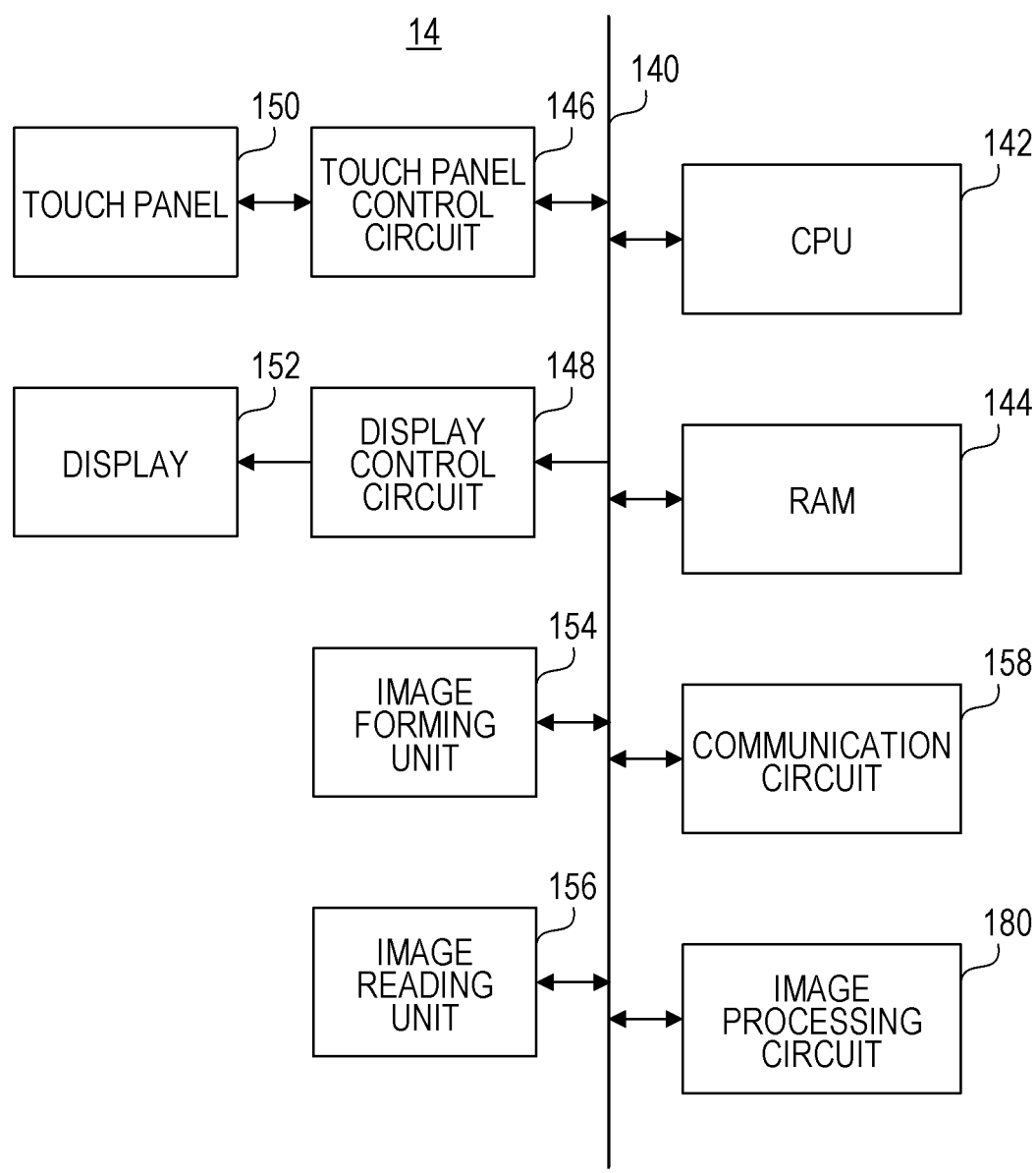
FIG. 2 is a block diagram illustrating an electrical structure of an image forming apparatus shown in FIG. 1.

FIG. 2 is a block diagram illustrating an electrical structure of the image forming apparatus 14 shown in FIG. 1. In FIG. 2, the image forming apparatus 14 includes a CPU 142. RAM 144, a touch panel control circuit 146, a display control circuit 148, an image forming unit 154, an image reading unit 156, a communication circuit 158, and an image processing circuit 180 are connected to the CPU 142 over a bus 140. Moreover, a touch panel 150 is connected to the touch panel control circuit 146, and a display 152 is connected to the display control circuit 148. As the display 152, for example, an LCD display or an electro-luminescence (EL) display may be used. In the first embodiment, a capacitive touch panel is used as the touch panel 150. The touch panel 150 is provided on a display surface of the display 152. Note that a touch panel display in which the touch panel 150 and the display 152 are integrally formed may be employed. The touch panel 150 does not have to be limited to the capacitive touch panel, but a touch screen in any system, for example, an electromagnetic induction touch panel, a resistive film touch panel, an infrared touch panel, or the like may be used.

The CPU 142 overall controls the image forming apparatus 14. The RAM 144 is used as a work area and a buffer area of the CPU 142.

The touch panel control circuit 146 gives a voltage or the like to be used to the touch panel 150, and when a touch operation (a touch input) in a touch effective area of the touch panel 150 is detected, the touch panel control circuit 146 outputs, to the CPU 142, touch coordinate data denoting the location of the touch input thus detected.

The display control circuit 148 includes a GPU, VRAM, and the like, and under the control of the CPU 142, the GPU generates, on the VRAM, display image data for displaying various screens in the display 152 by using image generation data 304b (see FIG. 7) stored in the RAM 144, and outputs the display image data generated to the display 152. As an example, a home screen 100 (see FIG. 3) is displayed in the display 152. The home screen is a screen for selection of a desired job from various jobs executable by the image forming apparatus 14. Note that in the first embodiment, jobs are copying (including scanning of documents), printing, fax transmission, and the like.

The image formation unit (printing apparatus) 154 is a general-purpose laser printer, includes a photoreceptor, a charger, an exposure apparatus, a development apparatus, a transfer apparatus, a fixing apparatus, and the like, and is configured to print an image corresponding to print data processed by the image processing circuit onto recording paper (a paper sheet) and the like.

The image reading unit 156 includes a light source, a plurality of mirrors, an imaging lens, a line sensor, and the like. The image reading unit 156 exposes a document surface to the light source and guides reflected light reflected off the document surface to the imaging lens by the plurality of mirrors. Then, an image of the reflected light is formed onto a light receiving element of the line sensor by the imaging lens. The line sensor detects the luminance or the chromaticity of the reflected light whose image is formed onto the light receiving element, and the line sensor generates read image data based on the image on the document surface.

The communication circuit 158 is a communication circuit to be connected to a dedicated network provided between the communication circuit 158 and the relay server 12. The communication circuit 158 is a wired communication circuit or a wireless communication circuit and communicates with the relay server 12 over the dedicated network in accordance with an instruction given from the CPU 142.

The image processing circuit 180 is a circuit configured to perform raster image processing (RIP) of converting print data which is expressed in a printer language and which is transmitted from the relay server 12 into image data (print image data) such as bitmap data. Moreover, the image processing circuit 180 also serves as a circuit configured to perform a color reproduction process for printing the image corresponding to the print image data in a color close to its original color. Note that the color reproduction process is executed in accordance with a color table of an ICC profile or a color reproduction table specific to the image forming apparatus 14.

Note that the electrical structure of the image forming apparatus 14 shown in FIG. 2 is a mere example and does not have to be limited to this example. For example, the image forming apparatus 14 may be provided with an operation button as hardware such as an operation panel as another input unit or may be connected to a keyboard as hardware as another input unit.

Each content server 200 is a server for providing contents in content service (for example, printing of content) and includes components such as a CPU, RAM, and a communication module. The plurality of content servers 200 are provided, and each of the plurality of content servers 200 corresponds to any of the plurality of contents providers.

Moreover, each of the plurality of content servers 200 stores a content, for example, image data such as landscape pictures, portrait pictures, animation images, character images, and illustration images, musical notes, maps, and document data such as newspaper. These contents are provided to the image forming apparatus 14 from the content servers 200 via the relay server 12.

Note that the types of contents to be provided are different depending on the contents providers. Thus, each of the plurality of content servers 200 stores a corresponding one of the types of contents provided by respective contents providers corresponding to the content servers 200. Moreover, in the first example, the types of contents to be provided by the contents providers are determined in advance. For example, a content server 200 corresponding to a contents provider which provides landscape pictures stores image data of the landscape pictures, and a content server 200 corresponding to a contents provider which provides portrait pictures stores image data of the portrait pictures.

In the information processing system 10 having such a configuration, when the image forming apparatus 14 receives a prescribed user operation, a content designated by a user is provided from the content server 200 to the image forming apparatus 14 via the relay server 12, and the image forming apparatus 14 prints the content, which is provided, onto a prescribed paper sheet.

In a related art content providing system, however, a print setting (print condition) is not changeable for each content, and therefore, depending on types of contents specified by instructions given by a user, reproduction of the tinge, the character, and the like of a printed material may be inappropriate, and the printed material is not available in sufficient quality.

In order to avoid such inconvenience, the information processing system 10 of the first embodiment is configured to automatically configure a print condition according to the type of the content designated by a user.

Figure 3:
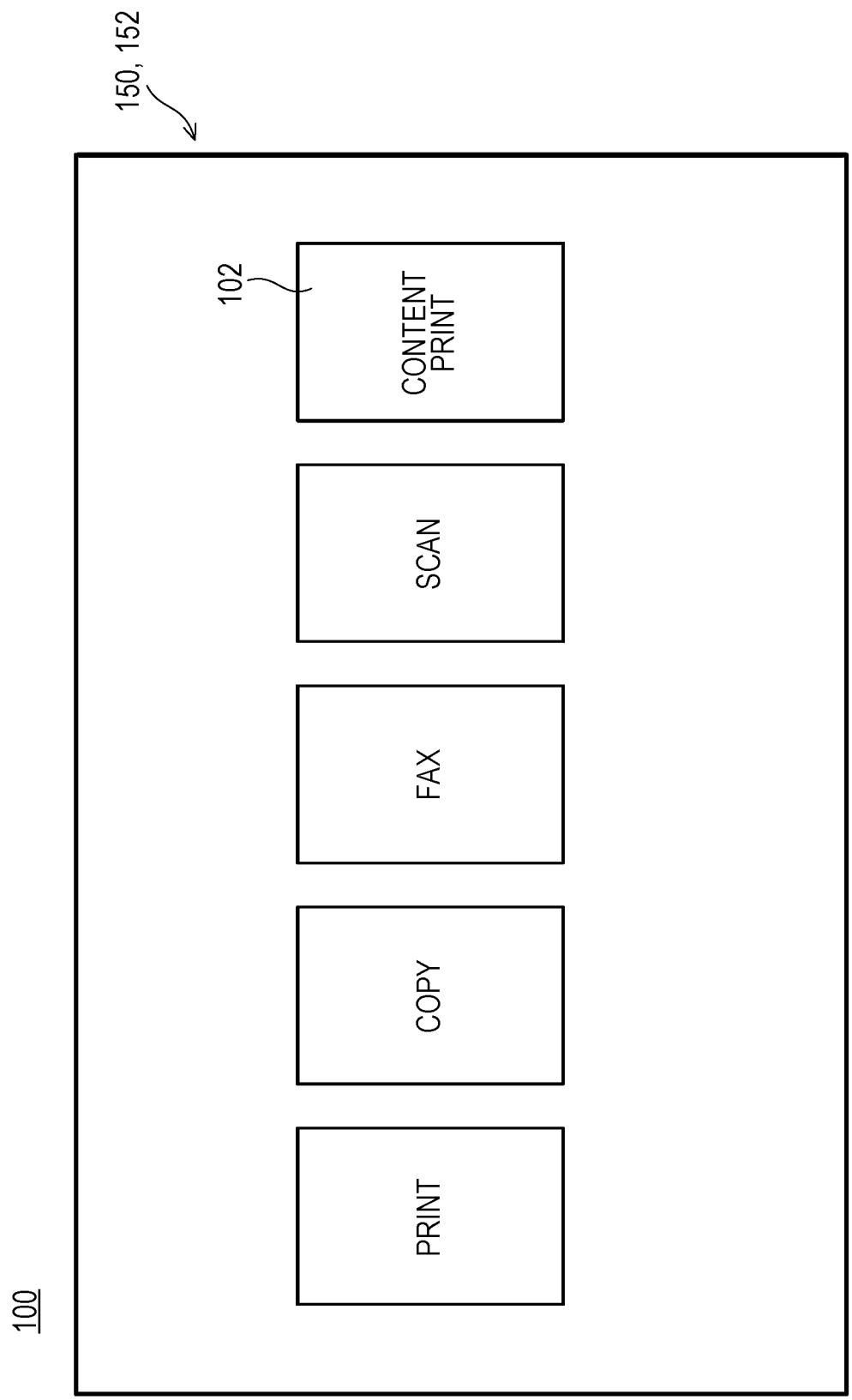
FIG. 3 is a view illustrating an example of a home screen of the image forming apparatus.
Figure 4:
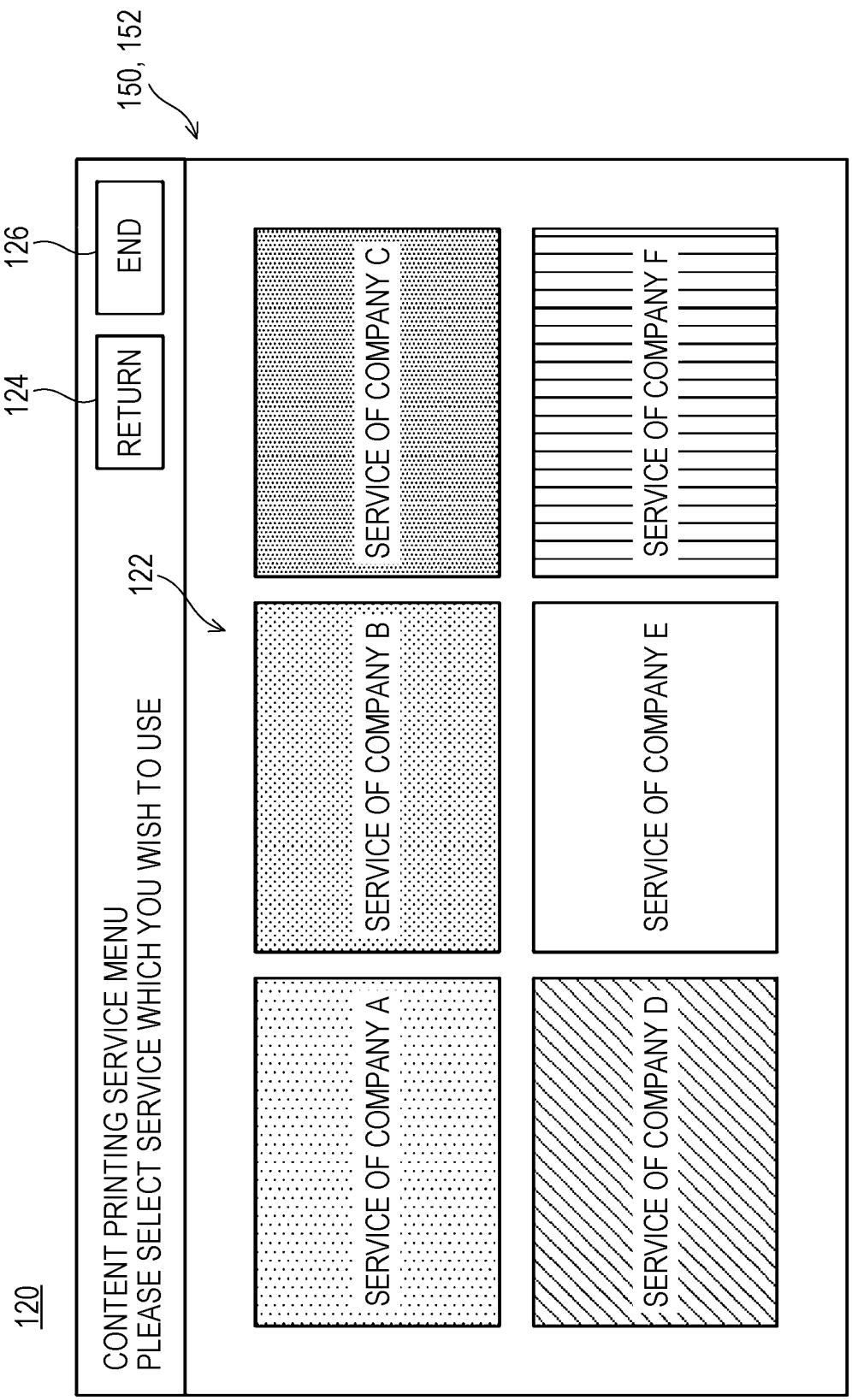
FIG. 4 is a view illustrating an example of a selection screen of the image forming apparatus.
Figure 5:
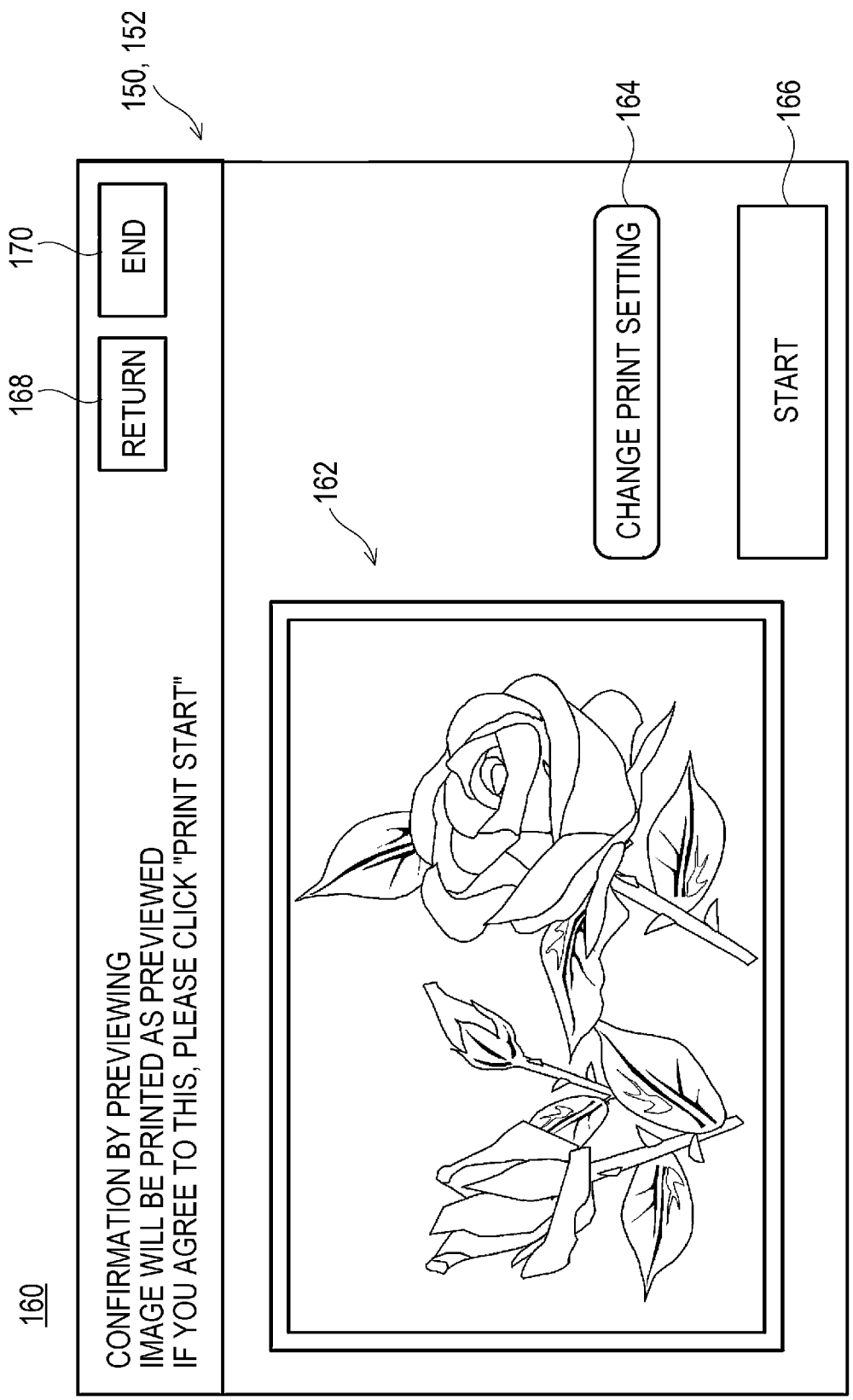
FIG. 5 is a view illustrating an example of a confirmation screen of the image forming apparatus.

With reference to FIGS. 3 to 5, an example of operation of the information processing system 10 will be described below. FIG. 3 is a view illustrating an example of a home screen 100 of the image forming apparatus 14. FIG. 4 is a view illustrating an example of a selection screen 120 of the image forming apparatus 14. FIG. 5 is a view illustrating an example of a confirmation screen 160 of the image forming apparatus 14.

When a power source of the image forming apparatus 14 is turned on, and the image forming apparatus 14 is in a stand-by mode in which the image forming apparatus 14 is ready for performing each function, the home screen 100 as illustrated in FIG. 3 is displayed in the display 152 of the image forming apparatus 14. In the home screen 100, images of software keys (icons) are displayed so that any of jogs such as copy, print, fax, and scan is selected to display an operation screen (setting screen) for the job thus selected. In the home screen 100, an image of an icon 102 for starting use of content providing service (content printing service) (hereinafter referred to as a "content print icon") is also displayed.

In the image forming apparatus 14, when the content print icon 102 is touched (selected), a selection screen 120 as illustrated in FIG. 4 is displayed in the display 152. The selection screen 120 is a screen for allowing a user to select service (or a contents provider providing the service) which the user desires. The selection screen 120 includes a plurality of selection icons 122, a return icon 124, and an end icon 126.

The plurality of selection icons 122 are icons for selection of the contents providers. Each of the plurality of contents providers is associated with a corresponding one of the plurality of selection icons 122. Moreover, in each of the plurality of selection icons 122, a character string, and the like relating to a corresponding one of the contents providers are displayed. Note that in each of the plurality of selection icons 122, a character string and an image relating to the description of a content provided by a corresponding one of the contents providers may be displayed.

To the return icon 124, a function of closing the selection screen 120 to return to an immediately preceding operation screen is assigned. For example, when the return icon 124 in the selection screen 120 is touched, the home screen 100 is displayed in a display 212. The same applies to a return icon 168 which will be described later.

To the end icon 126, a function of ending use of the content printing service is assigned. For example, when the end icon 126 is touched, the home screen 100 is displayed in the display 212. The same applies to an end icon 170 which will be described later.

When any of the plurality of selection icons 122 is touched, a content selection screen (not shown) for selection of a content provided by a contents provider corresponding to the selection icon 122 thus touched is displayed in the display 152.

When in the content selection screen, a user selects a content (print content), the image forming apparatus 14 transmits a control signal (transmission request signal) for requesting transmission of the print content selected by the user over a dedicated network to the relay server 12.

When receiving the transmission request signal which is transmitted from the image forming apparatus 14 and which denotes the print content, the relay server 12 transmits, over the Internet 16, a control signal (transmission request signal) for requesting transmission of the print content to the content server 200 of the contents provider which provides the print content.

The content server 200 receives the transmission request signal transmitted from the relay server 12 and transmits the print content corresponding to the transmission request signal to the relay server 12 over the Internet 16.

Next, when receiving the print content transmitted from the content server 200, the relay server 12 determines the type of the print content. Note that as described above, in the first embodiment, the types of contents to be provided by contents providers are determined in advance. Thus, the type of the print content is specified (determined) based on the contents provider (contents provider 200) which is a provider of the print content. When determining the type of the print content, the relay server 12 then configures a print condition according to the type of the print content in accordance with a print condition table as illustrated in FIG. 6.

As illustrated in FIG. 6, the print condition table describes, correspondingly to names of the types of contents, setting contents (print conditions) of various types of print condition items.

The print condition table shown as an example in FIG. 6 describes "landscape picture", "portrait picture", "animation image", "document" and the like in fields for the names of the types of contents. Note that the types of contents shown in FIG. 6 are mere examples, and names of the types of other contents may be described in the field for the names of the types of contents. Moreover, "document" may be classified into "general document" and "presentation document".

Note that contents described in the field for the names of the types of contents are merely created and used for internal processes by the relay server 12. Thus, as long as the types of contents are identifiable, the names of the types of contents may be described in numerical digits or signs which are decipherable by humans.

Moreover, in the fields for the print condition items described are setting contents of items such as "output profile", "process resolution", "output resolution", "rendering intent", "gray compensation", "screen", "output gradation correction", "pure black", "pure color maintenance", "image compression", "enhancement/smoothing filter" and "line thinning/character thinning process". Note that the print condition items described in the print condition table shown in FIG. 6 are mere examples, but the print condition items do not have to be limited to these examples. For example, in the fields for the print condition items, image correction such as chroma correction, lightness correction, and hue correction, a scaling process, and the like may be described.

Thus, setting contents (print conditions) of respective print condition items configured in advance are described correspondingly to the names of the types of contents. For example, for the type of content which is a landscape picture or a portrait picture, a print condition which leads to smooth color reproduction and smooth gradation reproduction is described. Moreover, for the types of contents which are an animation image and a presentation document, a print condition which leads to vivid and accentuated gradation reproduction is described.

When a print condition according to the type of a print content is configured, the relay server 12 configures a setting command corresponding to the print condition. The setting command is a control command which is associated with the print content and which causes the image forming apparatus 14 to print the print content in accordance with the print condition corresponding to the setting command. Note that examples of the form of the setting command include a form of a command, such as a printer job language (PJL) command, a post script (PS) command, and a printer control language (PCL) command, by which electronic apparatuses are controllable.

When the setting command is configured, the relay server 12 transmits first data to the image forming apparatus 14. The first data includes a print content and a setting command associated with the print content. Note that the image data of the print content included in the first data is data expressed in a printer language.

When receiving the first data transmitted from the relay server 12, the image forming apparatus 14 performs the above-described RIP process and converts the image data of the print content into image data for printing (print image data) (print image data is generated). When the print image data is generated, the confirmation screen 160 as shown in FIG. 5 is displayed in the display 152. The confirmation screen 160 includes a preview image 162, a change icon 164, a start icon 166, the return icon 168, and the end icon 170.

The preview image 162 is a print image corresponding to the print image data generated by performing the RIP process. Note that the preview image 162 is the print image displayed in a state according to a print condition corresponding to the setting command. For example, when the print content is a landscape picture, the landscape picture is displayed in a state according to a print condition suitable for the landscape picture. Thus, a user can check an actual finish of the print content.

To the change icon 164, a function of instructing a change of the print condition is assigned. When the change icon 164 is touched, a change screen for changing the print condition is displayed. In the change screen, a change section for changing the setting content of each print condition item is displayed. The change section includes icons, slide bars, input boxes, and the like. The change screen enables a setting content of each of the above-described print condition items to be changed.

To the start icon 166, a function of instructing an execution of a print job is assigned. When the start icon 166 is touched, the print content is printed in accordance with the print condition corresponding to the setting command.

The CPU 12a in the relay server 12 executes an information processing program for the relay server 12 stored in the RAM 12b, and the CPU 142 of the image forming apparatus 14 executes an information processing program for the image forming apparatus 14 stored in the RAM 144, thereby realizing the operation of the information processing system 10. Specific processes will be described later with reference to a flow diagram.

Figure 7:
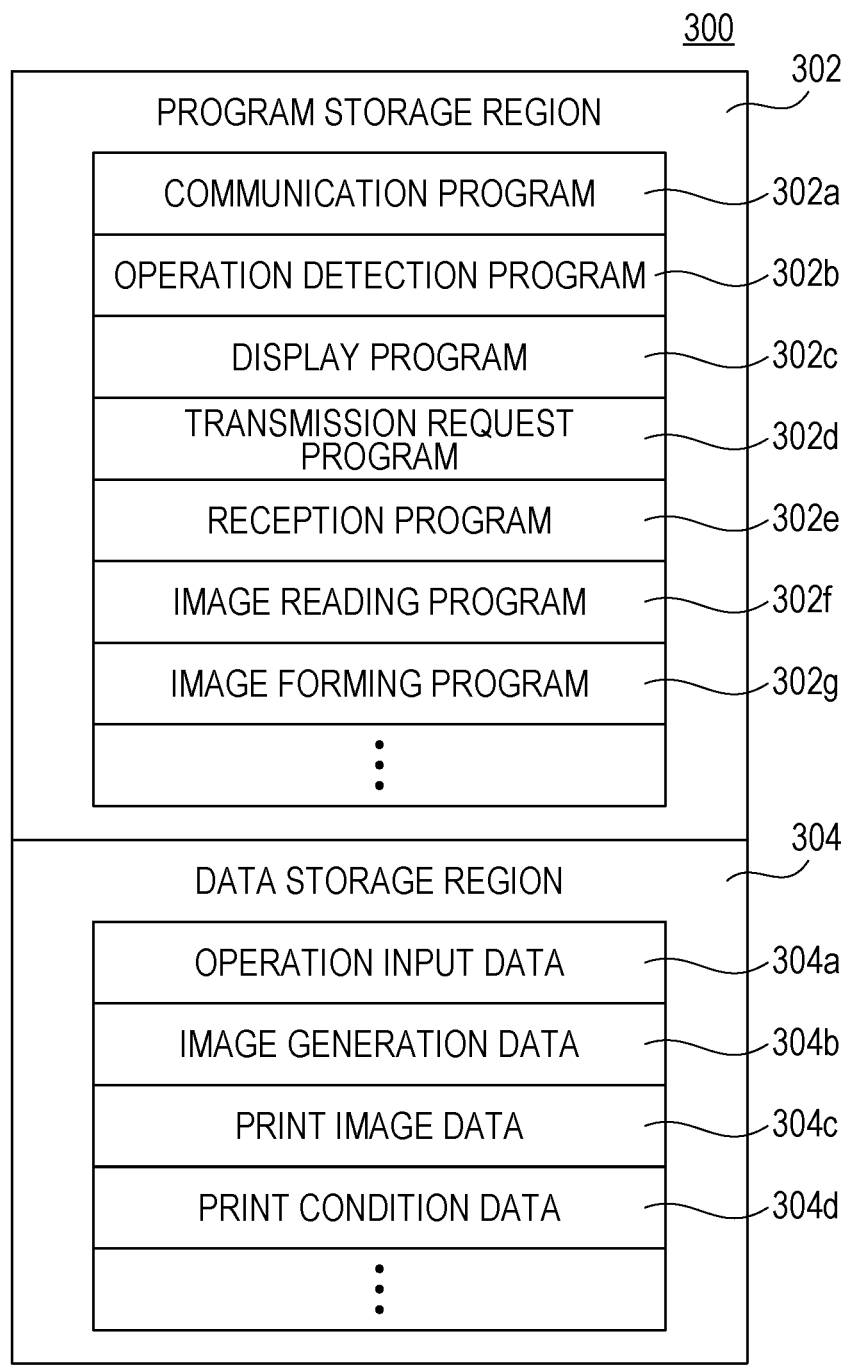
FIG. 7 is a view illustrating an example of a memory map of RAM of the image forming apparatus of FIG. 2.

FIG. 7 is a view illustrating an example of a memory map 300 of the RAM 144 of the image forming apparatus 14 shown in FIG. 2. As illustrated in FIG. 7, the RAM 144 includes a program storage region 302 and a data storage region 304. The program storage region 302 of the RAM 144 stores, as described above, the information processing program for the image forming apparatus 14. The information processing program for the image forming apparatus 14 includes a communication program 302a, an operation detection program 302b, a display program 302c, a transmission request program 302d, a reception program 302e, an image reading program 302f, and an image forming program 302g.

The communication program 302a is a program for performing communication with the relay server 12 over a dedicated network.

The operation detection program 302b is a program for detecting a touch input, and the CPU 142 stores touch coordinate data acquired in accordance with the operation detection program 302b in the RAM 144 in chronological order. Note that as described above, when a hardware button is provided, and when a hardware keyboard is connected, input of the button or the key is also detected in accordance with the operation detection program 302b.

The display program 302c is a program for generating, based on the image generation data 304b described later, display image data, that is, screen data such as the home screen 100, the selection screen 120, and the confirmation screen 160 and for outputting the display image data to the display 152.

The transmission request program 302d is a program which designates, when a user selects a print content, the print content and transmits a transmission request signal to the relay server 12. Note that to transmit the transmission request signal, the communication program 302a is executed.

The reception program 302e also serves as a program for receiving the first data transmitted from the relay server 12. Note that to receive various types of data, the communication program 302a is executed.

The image reading program 302f is a program for controlling the image reading unit 156 to read (scan) an image in a document mounted on a document mounting platen and for outputting an image signal (scan image data) corresponding to the image read.

The image forming program 302g is a program for controlling the image formation unit 154 to form a multicolor or monochrome image according to the print image data 304c onto a recording medium (paper sheet).

Note that the program storage region 302 also stores a program for causing the image processing circuit 180 to execute the RIP process and the color reproduction process, and a program for selecting and executing various types of functions included in the image forming apparatus 14, and the like although the illustration thereof is omitted.

Moreover, the data storage region 304 of the RAM 144 stores an operation input data 304a, the image generation data 304b, a print image data 304c, a print condition data 304d, and the like.

The operation input data 304a is data which is touch coordinate data detected in accordance with the operation detection program 302b and stored in chronological order. Note that the operation input data 304a may include operation data about a hardware button or key.

The image generation data 304b is data which is polygon data, texture data, or the like for generating display image data corresponding to various types of screens to be displayed in the display 152.

The print image data 304c is print image data obtained by converting the image data of the print content included in the first data transmitted from the relay server 12 by the RIP process.

The print condition data 304d is data corresponding to a print condition represented by a setting command associated with the print content transmitted from the relay server 12.

The data storage region 304 may store other data used to execute an information processing program for the image forming apparatus 14 or may be provided with a timer (counter) or a register used to execute the information processing program for the image forming apparatus 14 although the illustration thereof is omitted.

Figure 8:
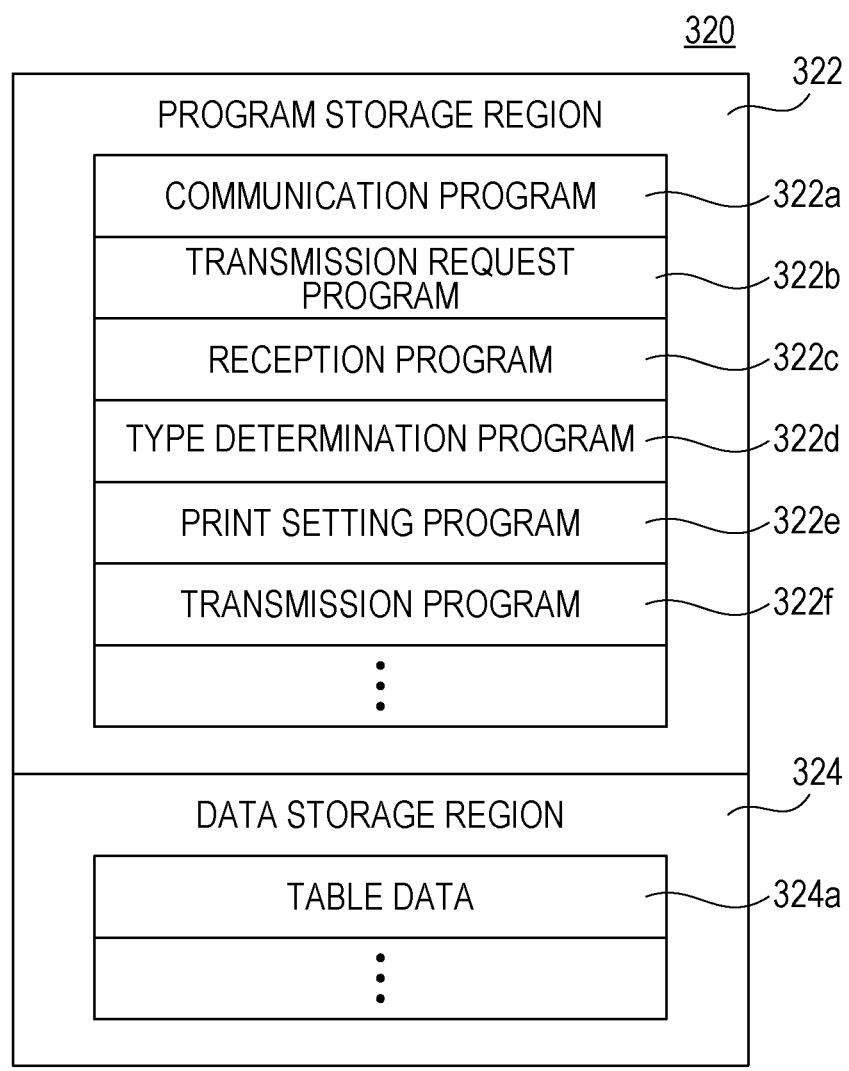
FIG. 8 is a view illustrating an example of a memory map of RAM of a relay server of FIG. 1.

FIG. 8 is a view illustrating an example of a memory map 320 of the RAM 12b in a relay server 12 of FIG. 1. As illustrated in FIG. 8, the RAM 12b includes a program storage region 322 and a data storage region 324. The program storage region 322 of the RAM 12b stores, as described above, the information processing program for the relay server 12. The information processing program for the relay server 12 includes a communication program 322a, a transmission request program 322b, a reception program 322c, a type determination program 322d, a print setting program 322e, and a transmission program 322f.

The communication program 322a is a program for communication with the content server 200 over a network or for communication with the image forming apparatus 14 over a dedicated network.

The transmission request program 322b is a program for transmitting, when the transmission request signal of the print content transmitted from the image forming apparatus 14 is received, a transmission request signal with the print content being designated to the content server 200 corresponding to a contents provider which provides the print content. Note that to transmit the transmission request signal, the communication program 302a is executed.

The reception program 322c is a program for receiving the transmission request signal of the print content transmitted from the image forming apparatus 14. Moreover, the reception program 322c is a program for receiving the print content transmitted from the content server 200. Note that to perform reception, the communication program 322a is executed.

The type determination program 322d is a program for determining, when the print content transmitted from the content server 200 is received, the type of the print content in accordance with the contents provider (content server 200) which provides the print content.

The print setting program 322e is a program for configuring, based on a setting condition table, a print condition of the print content in accordance with the type of the print content determined in accordance with the type determination program 322d.

The transmission program 322f is a program for transmitting the first data to the image forming apparatus 14. The first data includes the print content transmitted from the content server 200 and a setting command corresponding to the print condition according to the type of the print content. Note that to perform transmission, the communication program 322a is executed.

Note that the program storage region 322 also stores, for example, a program for selecting and executing various types of functions of the relay server 12 although the illustration thereof is omitted.

Moreover, the data storage region 324 of the RAM 12b stores table data 324a and the like. The table data 324a is data such as the above-described setting condition table. Note that the table data 324a is stored in, for example, a principal storage unit of the relay server 12. The table data 324a is read from the principal storage unit of the relay server 12 and stored in the RAM 12b as necessary.

The data storage region 324 may store other data used to execute the information processing program for the relay server 12 or may be provided with a timer (counter) or a register used to execute the information processing program for the relay server 12 although the illustration thereof is omitted.

Figure 9:
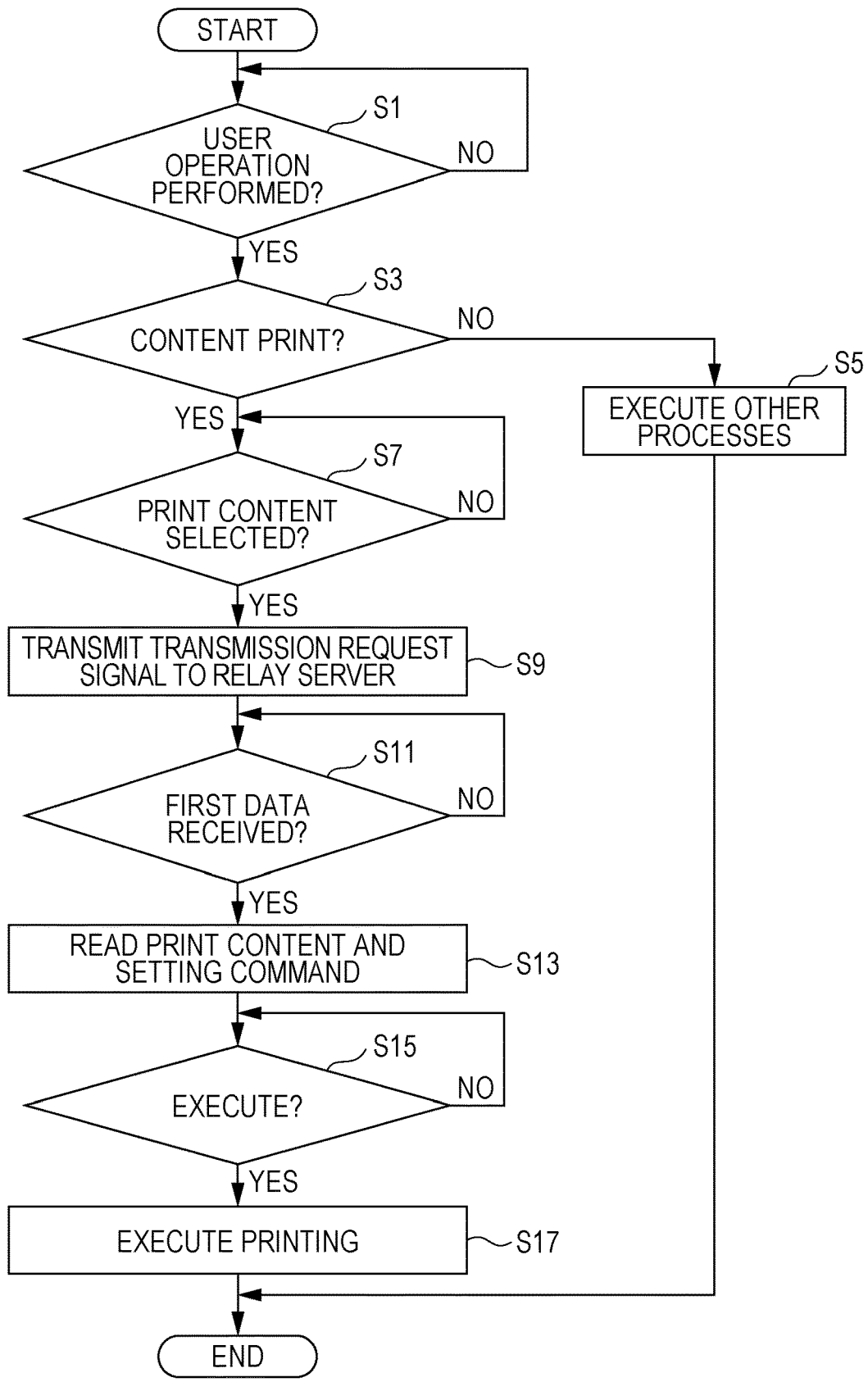
FIG. 9 is a flow diagram illustrating an example of information processing by a CPU in the image forming apparatus of FIG. 2.

FIG. 9 is a flow diagram illustrating an example of information processing executed by the CPU 142 in the image forming apparatus 14 shown in FIG. 2. The information processing is started when the power source of the image forming apparatus 14 is turned on. Note that when the information processing is started, the home screen 100 is displayed in the display 152.

As illustrated in FIG. 9, when the CPU 142 of the image forming apparatus 14 starts the information processing, the CPU 142 determines whether or not a user operation is performed in step S1. If NO is determined in step S1, that is, if it is determined that the user operation is not performed, the process returns to the identical step S1.

In contrast, if YES is determined in step S1, that is, if it is determined that the user operation is performed, it is determined in step S3 whether or not printing of content is selected. In this embodiment, it is determined whether or not the content print icon 102 in the home screen 100 is touched. If NO is determined in step S3, that is, if it is determined that the printing of content is not selected, other processes are executed in step S5, and the information processing is terminated. Examples of other processes performed in step S5 include a process of selecting any of jobs in accordance with an instruction given by a user, a process of performing various settings for the job thus selected, and a process of staring or stopping the job selected.

In contrast, if YES is determined step S3, that is, if it is determined that the printing of content is selected, it is determined whether or not the print content is selected in step S7. If No is determined in step S7, that is, if it is determined that the print content is not selected, the process returns to the identical step S7.

In contrast, if YES is selected in step S7, that is, if it is determined that the print content is selected, a transmission request signal for requesting transmission of the print content selected is transmitted to the relay server 12 in step S9, and it is determined whether or not the first data is received in step S11. If NO is determined in step S11, that is, if it is determined that the first data is not received, the process returns to the identical step S11.

In contrast, if YES is determined in step S11, that is, if it is determined that the first data is received, the print content included in the first data and a setting command according to the type of the print content are read in step S13, and it is determined whether or not the printing of content is executed in step S15. In this embodiment, the confirmation screen 160 is displayed in the display 152, and it is determined whether or not the start icon 166 is selected in the confirmation screen 160. If NO is determined in step S15, the process returns to the identical step S15.

In contrast, if YES is determined in step S15, that is, if it is determined that the printing of content is executed, the print content is printed in accordance with the print condition denoted by the setting command in step S17, and the information processing is terminated.

Note that the information processing may be terminated if a state corresponding to NO (the user operation is not performed) in step S1, a state corresponding to NO (the print content is not selected) in step S7, or a state corresponding to NO (the start icon 166 is not selected) in step S15 continues for a predetermined period.

Figure 10:
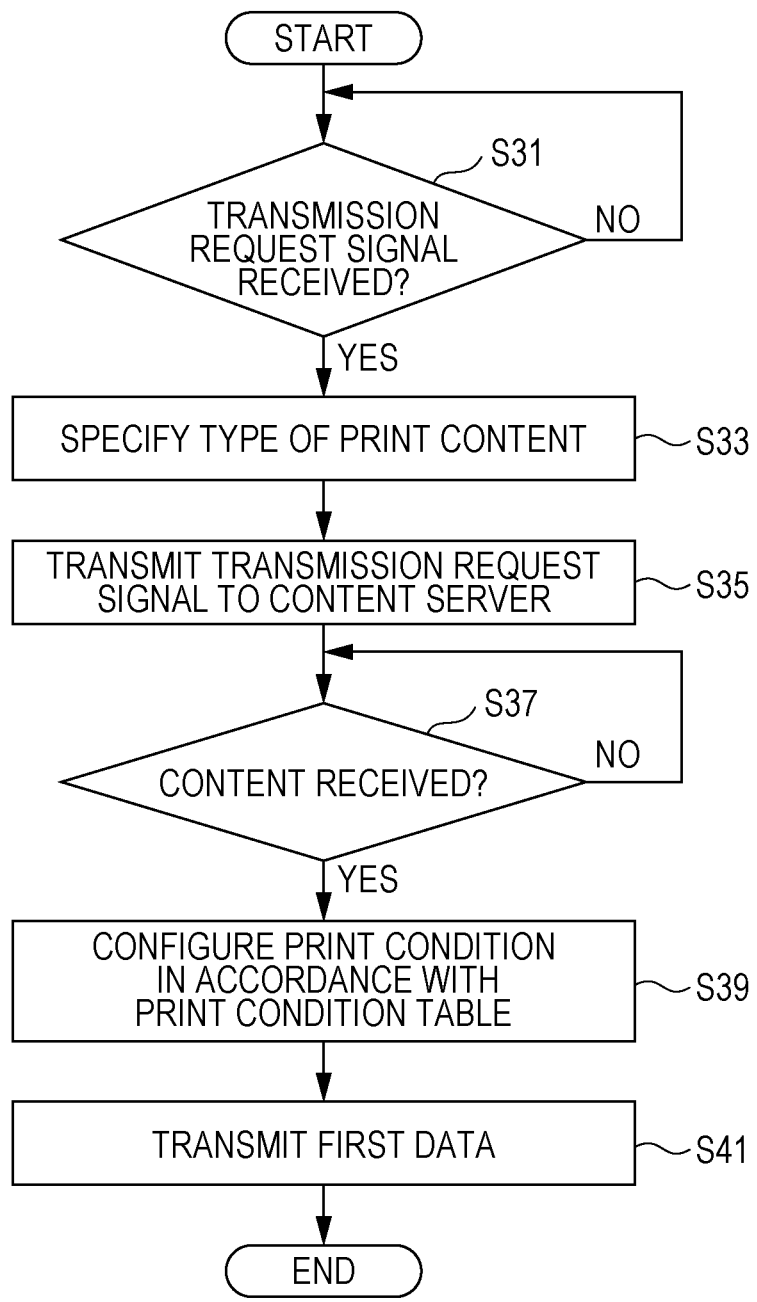
FIG. 10 is a flow diagram illustrating an example of information processing by a CPU of the relay server of FIG. 1.

Next, information processing executed by the CPU 12a in the relay server 12 will be described. FIG. 10 is a flow diagram illustrating an example of information processing by a CPU 12a in the relay server 12 shown in FIG. 1.

As illustrated in FIG. 10, the CPU 12a in the relay server 12 starts the information processing, and the CPU 12a determines whether or not the transmission request signal of the print content is received in step S31. If NO is determined in step S31, that is, if it is determined that the transmission request signal of the print content is not received, the process returns to the identical step S31.

In contrast, if YES is determined in step S31, that is, if it is determined that the transmission request signal of the print content is received, the type of the print content received is determined in step S33, the transmission request signal for requesting transmission of the print content is transmitted to the content server 200 of the contents provider which provides the print content in step S35, and it is determined whether or not the print content is received in step S37. If NO is determined in step S37, that is, if it is determined that the print content is not received, the process returns to the identical step S37.

In contrast, if YES is determined in step S37, that is, if it is determined that the print content is received, a print condition according to the type of the print content is configured with reference to the print condition table in step S39, and the first data is transmitted to the image forming apparatus 14 in step S41, and the information processing is terminated. The first data includes the print content and the setting command corresponding to the print condition according to the type of the print content.

According to the first embodiment, a print condition according to the print content is automatically configured in the relay server 12 in accordance with the type of content designated by a user, which enables the quality of the printed material to be improved in content providing service.

Moreover, according to the first embodiment, the type of a print content is determined in accordance with a contents provider (content server 200) which provides the print content. Therefore, it is possible to configure a print condition in accordance with the print content with a simple configuration.

Second Embodiment

An information processing system 10 of a second embodiment is the same as that of the first embodiment except that the image forming apparatus 14 may store print conditions according to the types of contents, and the print conditions may be configured in the image forming apparatus 14, and therefore, differences from the first embodiment will be described, and duplicate description will be omitted.

The image forming apparatus 14 of the second embodiment creates a print condition table (print condition table for an image forming apparatus) which describes print conditions of contents which the image forming apparatus 14 has printed. The print condition table for the image forming apparatus is a table similar to the print condition table (print condition table for a relay server) stored in the relay server 12.

When the image forming apparatus 14 receives first data including a content which the image forming apparatus 14 has not printed, the image forming apparatus 14 creates or updates the print condition table with a print condition denoted by a setting command included in the first data. Specifically, in fields for the names of the types of contents, the types of contents which are included in the first data and which the image forming apparatus 14 has not printed are described, and in accordance with the types of the contents, setting contents for respective print condition items included in the setting command are described.

Moreover, the relay server 12 of the second embodiment creates a transmission history table which describes types of contents which the relay server 12 has transmitted to the image forming apparatus 14 as illustrated in FIG. 11. The information processing system 10 of the second embodiment includes a plurality of image forming apparatuses 14. Thus, in the fields for the names of the image forming apparatuses 14, the names of the plurality of image forming apparatuses 14 are described. Thus, the transmission history table includes identification information for identifying each of the plurality of image forming apparatuses 14 to be connected to the relay server 12 and information (transmission history information) regarding whether or not each type of the contents has been transmitted to the image forming apparatus 14 in accordance with the identification information of the image forming apparatus 14.

For example, in the example of the transmission history table shown in FIG. 11, in the fields for the names of the image forming apparatuses 14, "image forming apparatus a", "image forming apparatus b", "image forming apparatus c", and the like are described.

When the relay server 12 transmits, to the image forming apparatus 14, the first data including contents which the relay server 12 has not transmitted to the image forming apparatus 14, the relay server 12 describes information for the types of contents which the relay server 12 has transmitted to the image forming apparatus 14 (for example, describes "○" in the field), and the relay server 12 updates the transmission history table. On the other hand, in the transmission history table, "-" is described for the types of contents which the relay server 12 has not transmitted to the image forming apparatus 14.

In the second embodiment, when the relay server 12 receives a print content transmitted from a content server 200, the relay server 12 determines, in accordance with the transmission history table, whether or not the relay server 12 has transmitted a content which is the same type as the print content to the image forming apparatus 14 which transmits the transmission request of the print content (transmission destination of the print content). When the relay server 12 has not transmitted the content which is the same type as the print content, the relay server 12 transmits, in a manner similar to the first embodiment, the first data to the image forming apparatus 14. The first data includes the print content and the setting command corresponding to the print condition according to the type of the print content.

In contrast, when the relay server 12 has transmitted the content which is the same type as the print content, the relay server 12 transmits second data to the image forming apparatus 14. The second data includes the print content and type information denoting the type of the print content. Note that the type information is not only information for directly specifying the type of the print content but may include information or the like denoting a contents provider which provides the print content.

When the image forming apparatus 14 receives the second data transmitted from the relay server 12, the image forming apparatus 14 specifies the type of the print content in accordance with the type information included in the second data. When the type of the print content is specified, the image forming apparatus 14 configures a print condition according to the type of the print content in accordance with the print condition table. When the print condition is configured, a preview image of the print content is generated in accordance with the print condition, and a confirmation screen 160 is displayed in the display 152.

Note that operation of the information processing system 10 after the confirmation screen 160 is displayed is the same as that in the first embodiment, and the description thereof is thus omitted. Moreover, operation of the information processing system 10 when the confirmation screen 14 receives the first embodiment is the same as that in the first embodiment, and the description thereof is thus omitted.

Note that in the second embodiment, in order to realize the operation as described above, the information processing program for the image forming apparatus 14 stored in RAM 144 of the image forming apparatus 14 includes a type determination program for determining the type of the print content, a print setting program for configuring print conditions of the print contents, and the like. Moreover, a data storage region 304 of the RAM 144 of the image forming apparatus 14 stores, for example, table data including data of a setting condition table. Moreover, an information processing program for the relay server 12 stored in RAM 12*b* in the relay server 12 includes, for example, a history determination program for determining whether or not the relay server 12 has transmitted a content which is the same type as the print content to the image forming apparatus 14 which is a transmission destination of the print content. Furthermore, table data 324*a* stored in a data storage region 324 of the RAM 12*b* in the relay server 12 includes data of the transmission history table which describes the types of contents which the relay server 12 has transmitted to the image forming apparatus 14.

With reference to a flow diagram, information processing in the second embodiment will be described below, wherein processing the same as the information processing described in the first embodiment is denoted by the same reference signs, and duplicate description will be omitted or simplified.

Figure 12:
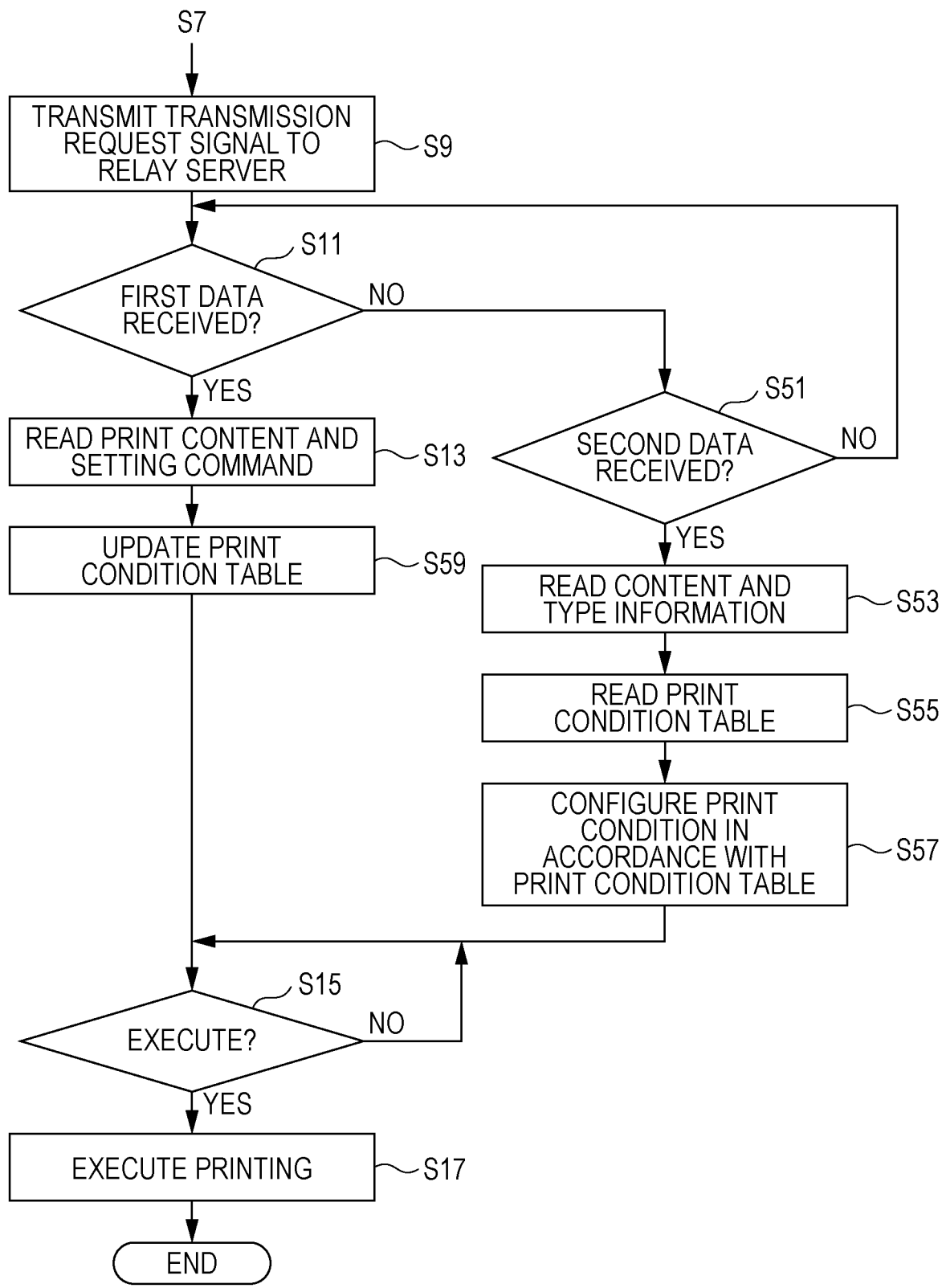
FIG. 12 is a flow diagram illustrating an example of information processing by a CPU of an image forming apparatus of the second embodiment.

FIG. 12 is a flow diagram illustrating an example of information processing by a CPU 142 of the image forming apparatus 14 of the second embodiment.

As illustrated in FIG. 12, when the information processing is started, a CPU 202 transmits a transmission request signal for requesting transmission of the print content selected to the relay server 12 in step S9, and if NO is determined in step S11, it is determined whether or not second data is received in step S51. If NO is determined in step S51, that is, if it is determined that the second data is not received, the process returns to the identical step S11. In contrast, if YES is determined in step S51, that is, if it is determined that the second data is received, the print content included in the second data and type information denoting the type of the print content are read in step S53, a print condition table for the image forming apparatus is read in step S55, a print condition according to the type of the print content is configured with reference to the print condition table in step S57, and the process proceeds to step S15.

In contrast, if YES is determined in step S11, the print content and the setting command according to the type of the print content are read in step S13, the print condition table is updated based on the setting command included in the first data in step S59, and the process proceeds to step S15. Note that when the print condition table itself is not present, a print condition table is created in step S59.

Note that processes up to step S9 and processes in and subsequent to step S15 are the same as those in the first embodiment, and therefore, the description thereof is omitted.

Figure 13:
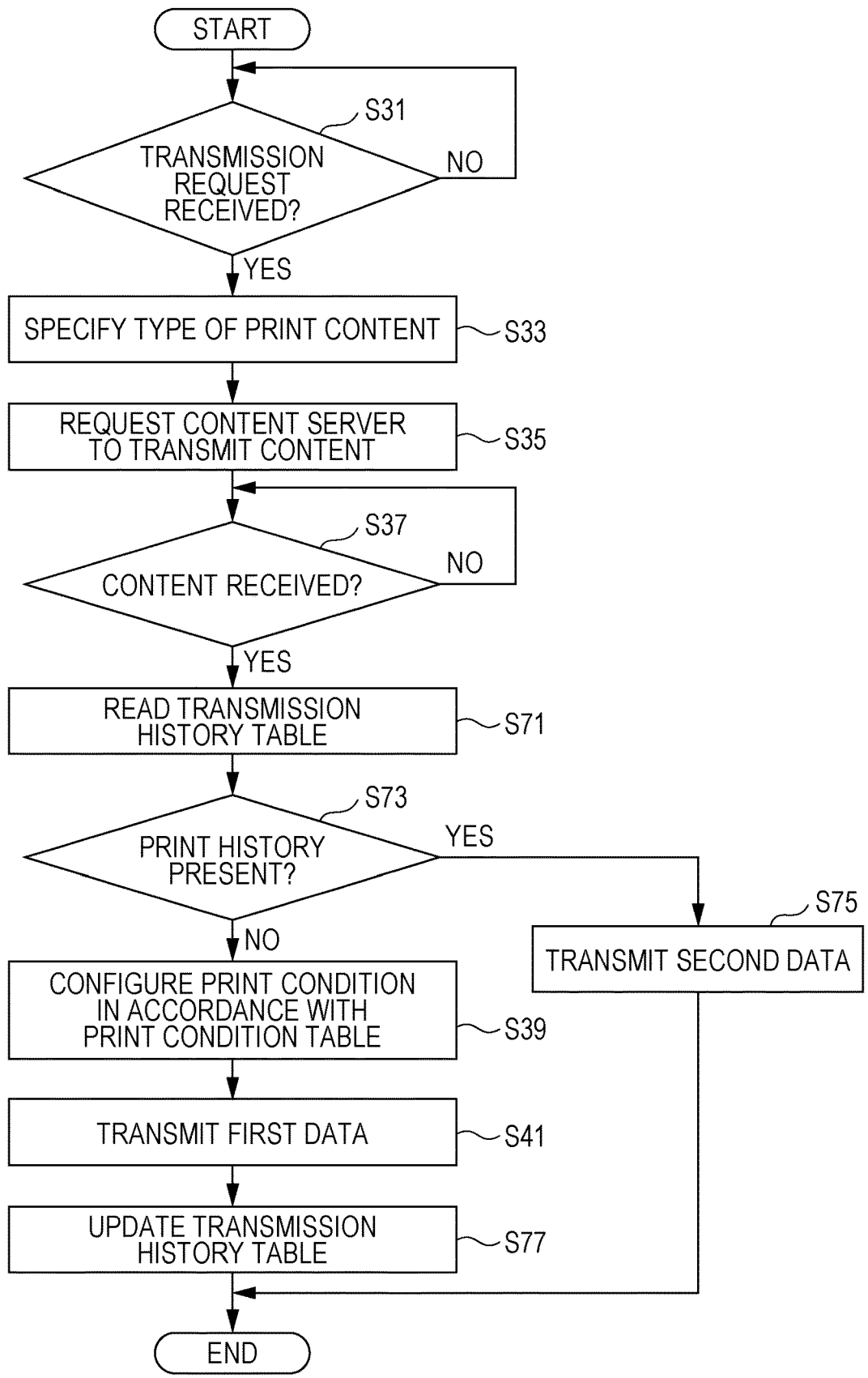
FIG. 13 is a flow diagram illustrating an example of information processing by a CPU in a relay server of the second embodiment.

Next, connection processing executed by the CPU 142 in the image forming apparatus 14 will be described. FIG. 13 is a flow diagram illustrating an example of information processing by a CPU 12a in the relay server 12 of the second embodiment.

As illustrated in FIG. 13, the CPU 12a in the relay server 12 starts the information processing, and if YES is determined in step S37, the transmission history table is read in step S71, and it is determined whether or not the image forming apparatus 14 which is a transmission destination of the print content includes print history of a content which is the same type as the print content in step S73. In this embodiment, it is determined whether or not the relay server 12 has transmitted a content which is the same type as the print content to the image forming apparatus 14 which is a transmission destination of the print content.

If YES is determined in step S73, that is, if it is determined that the image forming apparatus 14 which is a transmission destination includes print history of a content which is the same type as the print content, the second data is transmitted to the image forming apparatus 14 in step S75, and the information processing is terminated.

In contrast, if NO is determined in step S73, that is, if it is determined that the image forming apparatus 14 which is a transmission destination includes no print history of a content which is the same type as the print content, a print condition according to the type of the print content is configured in step S39, the first data is transmitted to the image forming apparatus 14 in step S41, the transmission history table is updated in step S77, and the information processing is terminated. Note that when the transmission history table itself is not present, the process in step S71 is omitted, and a transmission history table is newly created in step S77.

According to the second embodiment, when it is possible to configure a print condition in the image forming apparatus 14, type information in place of the setting command is transmitted from the relay server 12 to the image forming apparatus 14, which enables the amount of data transmitted and received to be reduced, thereby increasing the communication efficiency.

Third Embodiment

An information processing system 10 of a third embodiment is the same as that of the first embodiment except for display contents in a confirmation screen 160, and therefore, differences from the first embodiment will be described, and duplicate description will be omitted.

Figure 14:
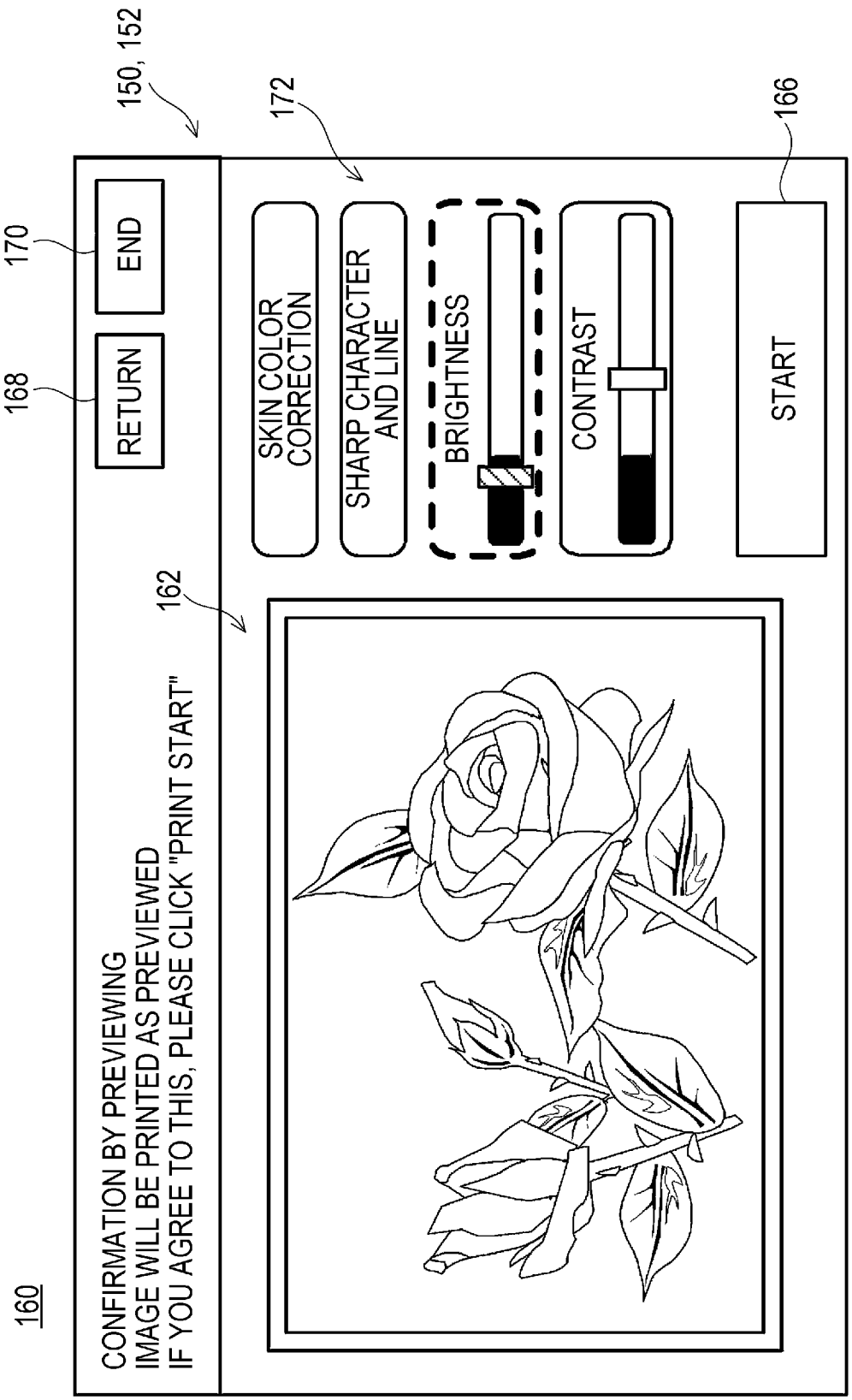
FIG. 14 is a view illustrating an example of a confirmation screen of a third embodiment.
Figure 15:
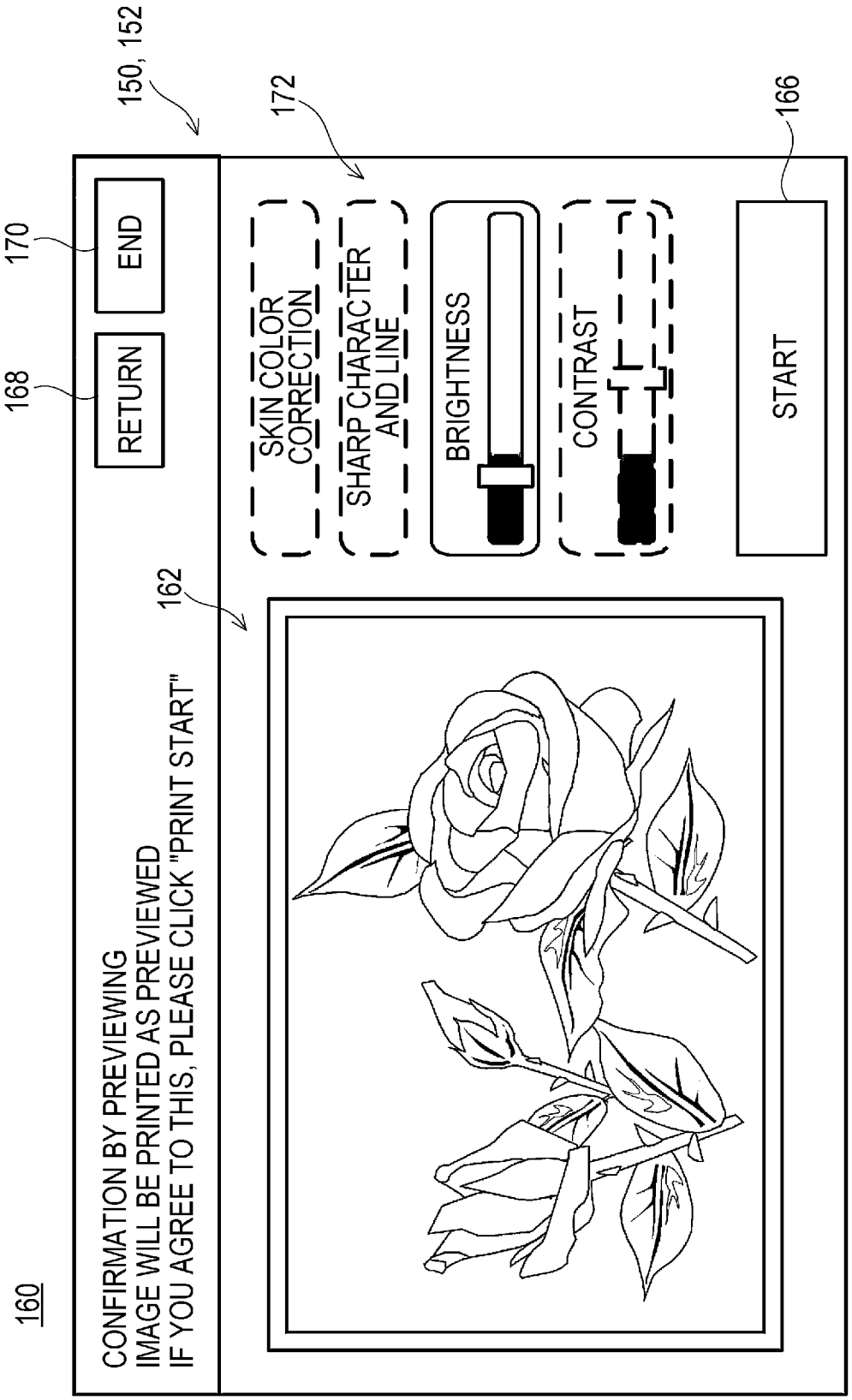
FIG. 15 is a view illustrating another example of the confirmation screen of the third embodiment.

FIG. 14 is a view illustrating an example of the confirmation screen 160 of the third embodiment. FIG. 15 is a view illustrating another example of the confirmation screen 160 of the third embodiment.

As illustrated in FIGS. 14 and 15, in the third embodiment, the confirmation screen 160 includes a change region 172 for changing print conditions in place of the change icon 164. In the change region 172, setting contents as a plurality of print condition items are displayed. For example, in the change region 172, a change section for changing the setting content of each print condition item is displayed. The change section includes icons, slide bars, input boxes, and the like.

Note that of the plurality of print condition items included in the change region 172, a print condition item changed from an initial setting (default) in accordance with a setting suitable for a print content is displayed in an emphasized manner. For example, when the setting of "brightness" is changed from the default, a display mode of an icon corresponding to the "brightness" changes as illustrated in FIG. 14. Specifically, an icon corresponding to the "brightness" is provided with patterns, colored in an appropriate color, or the like. Alternatively, as illustrated in FIG. 15, an icon other than the icon corresponding to the "brightness" may be displayed to be grayed out (or semi-transparent). Alternatively, the change region 172 may be configured to display only a print condition item changed from the default although the drawing of which is omitted.

According to the third embodiment, in the confirmation screen 160, a print condition item changed from the default in accordance with a setting suitable for a print content is displayed in an emphasized manner. Thus, a user can confirm the setting content which is changed.

Note that the aspect shown in third embodiment is adoptable in combination with the second embodiment.

Moreover, in the above-described embodiments, the type of a print content is determined in accordance with the contents provider which is a provider of the print content, but the print content does not have to be limited to this example. For example, when metadata including information regarding the type of a print content is associated with the print content, the type of the print content may be specified in accordance with the information which denotes the type of the print content and which is included in the metadata. Alternatively, in accordance with the filename extension of a print content, the type of the print content may be specified. Alternatively, an image of a print content may be analyzed to specify the type of the print content. A specific method for analyzing an image of a print content to specify the type of the content is described in Applicant's Japanese Unexamined Patent Application Publication No. 2010-263639. Note that a process of analyzing the image may be executed by the relay server 12 or may be executed by the image forming apparatus 14.

Moreover, the above-described embodiments has described an example in which the image forming apparatus 14 is an image forming apparatus of the electrophotographic system, but the image forming apparatus 14 may be a dye-sublimation printer or an ink jet printer.

Furthermore, screens, specific components, and the like mentioned in the above-described embodiments are mere examples and may be accordingly changed in accordance with actual products. Moreover, the order of steps of the flow diagram shown in the above-described embodiments may be accordingly changed as long as the same result is obtained.

The present disclosure contains subject matter related to that disclosed in Japanese Priority Patent Application JP 2017-214132 filed in the Japan Patent Office on Nov. 6, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus which is connected to an output terminal and a plurality of content servers over a network, the information processing apparatus comprising:
a storage unit configured to store a print condition table generated for the same output terminal and describing a plurality of print conditions used by the same output terminal, the plurality of print conditions according to respective types of a plurality of contents provided from the plurality of content servers, and a transmission history table describing a type of a print content having been transmitted to the same output terminal;

an acquisition unit configured to acquire a print content from any of the plurality of content servers in accordance with a transmission request from the output terminal;

a determination unit configured to determine, with reference to the transmission history table, whether or not the print content is categorized as the same type of the print content in the transmission history table; and a transmission unit configured to transmit first data to the output terminal when the determination unit determines that the print content is not categorized as the same type, the first data including the print content acquired by the acquisition unit and a setting command denoting a print condition selected from the plurality of print conditions so as to correspond to a type of the print content, and transmit second data to the output terminal when the determination unit determines that the print content is categorized as the same type, the second data including the print content and type information denoting the type of the print content in place of the setting command, wherein the print condition table stores output profile, process resolution, output resolution, rendering intent, gray compensation, screen resolution, output gradation correction, pure black, pure color maintenance, image compression, enhancement/smoothing filter, and line thinning/character thinning process.

2. The information processing apparatus according to claim 1, further comprising a setting unit configured to configure the setting command corresponding to the print content in accordance with the type of the print content determined by the determination unit.

3. The information processing apparatus according to claim 2, wherein the determination unit is configured to determine the type of the print content in accordance with the content server which provides the print content.

4. The information processing apparatus according to claim 2, wherein the determination unit determines the types of the print content in accordance with the print contents acquired by the acquisition unit.

5. A non-transitory computer readable storage medium storing a control program that is executed in an information processing apparatus which is connected to an output terminal and a plurality of content servers over a network, the control program being configured to cause a processor of the information processing apparatus to:

store a print condition table generated for the same output terminal and describing a plurality of print conditions used by the same output terminal, the plurality of print conditions according to respective types of a plurality of contents provided from the plurality of content servers, and a transmission history table describing a type of a print content having been transmitted to the same output terminal, acquire a print content from any of the plurality of content servers in accordance with a transmission request from the output terminal, determine, with reference to the transmission history table, whether or not the print content is categorized as the same type of the print content in the transmission history table; and transmit first data to the output terminal when the print content is not categorized as the same type, the first data including the print content acquired by the acquisition unit and a setting command denoting a print condition selected from the plurality of print conditions so as to correspond to a type of the print content, and transmit second data to the output terminal when the print content is categorized as the same type, the second data including the print content and type information denoting the type of the print content in place of the setting command, wherein the print condition table stores output profile, process resolution, output resolution, rendering intent, gray compensation, screen resolution, output gradation correction, pure black, pure color maintenance, image compression, enhancement/smoothing filter, and line thinning/character thinning process.

6. A control method performed by a processor of an information processing apparatus which is connected to an output terminal and a plurality of content servers over a network, the control method comprising:

storing a print condition table generated for the same output terminal and describing a plurality of print conditions used by the same output terminal, the plurality of print conditions according to respective types of a plurality of contents provided from the plurality of content servers, and a transmission history table describing a type of a print content having been transmitted to the same output terminal, acquiring a print content from any of the plurality of content servers in accordance with a transmission request from the output terminal, determining, with reference to the transmission history table, whether or not the print content is categorized as the same type of the print content in the transmission history table, transmitting first data to the output terminal when the print content is not categorized as the same type, the first data including the print content acquired in the acquiring of the print content and a setting command denoting a print condition selected from the plurality of print conditions so as to correspond to a type of the print content, and transmitting second data to the output terminal when the print content is categorized as the same type, the second data including the print content and type information denoting the type of the print content in place of the setting command, wherein the print condition table stores output profile, process resolution, output resolution, rendering intent, gray compensation, screen resolution, output gradation correction, pure black, pure color maintenance, image compression, enhancement/smoothing filter, and line thinning/character thinning process.

7. An information processing system comprising:

an information processing apparatus connected to a plurality of content servers; and an output terminal connected to the information processing apparatus, wherein the information processing apparatus includes:

a first storage unit configured to store a first print condition table generated for the same output terminal and describing a plurality of print conditions used by the same output terminal, the plurality of print conditions according to respective types of a plurality of print contents provided from a plurality of content servers, and a transmission history table describing a type of a print content having been transmitted to the same output terminal;

an acquisition unit configured to acquire a print content from any of the plurality of content servers in accordance with a transmission request from the output terminal;

a determination unit configured to determine, with reference to the transmission history table, whether or not the print content is categorized as the same type of the print content in the transmission history table; and a transmission unit configured to
    transit first data to the output terminal when the determination unit determines that the print content is not categorized as the same type, the first data including the print content acquired by the acquisition unit and a setting command denoting a print condition selected from the plurality of print conditions so as to correspond to a type of the print content, and
    transmit second data to the output terminal when the determination unit determines that the print content is categorized as the same type, the second data including the print content and type information denoting the type of the print content in place of the setting command, and the output terminal includes:
    a second storage unit configured to store a second print condition table in which a plurality of print conditions corresponding to types of contents which the same output terminal has printed are described;
    a transmission request unit configured to request the information processing apparatus to transmit the print content;
    a reception unit configured to receive the first data or the second data;
    a setting unit configured to configure a print condition selected from the plurality of print conditions so as to correspond to the print content with reference to the second print condition table, in accordance with the type information included in the second data, when the reception unit receives the second data; and
    a print unit configured to print the print content, in accordance with a print condition denoted by the setting command included in the first data, when the reception unit receives the first data and to print the print contents in accordance with the print condition configured by the setting unit when the reception unit receives the second data, wherein when the reception unit receives the first data, the second print condition table stored in the second storage unit is updated, and wherein
    the first and second print condition tables store output profile, process resolution, output resolution, rendering intent, gray compensation, screen resolution, output gradation correction, pure black, pure color maintenance, image compression, enhancement/smoothing filter, and line thinning/character thinning process.

8. The information processing system according to claim 7, wherein
    the output terminal further includes
    a display; and
    a display control unit configured to display a confirmation screen in the display, the confirmation screen including a print condition denoted by the setting command included in the first data or a content of a print condition configured by the setting unit.

9. The information processing system according to claim 8, wherein
    the confirmation screen includes a changing section for changing configuration content of a print condition denoted by the setting command included in the first data or a setting content of a print condition configured by the setting unit.

\* \* \* \* \*